July 16, 1946.   S. E. WERNER   2,404,331
ELECTROMAGNETIC MOTOR
Filed Oct. 27, 1942
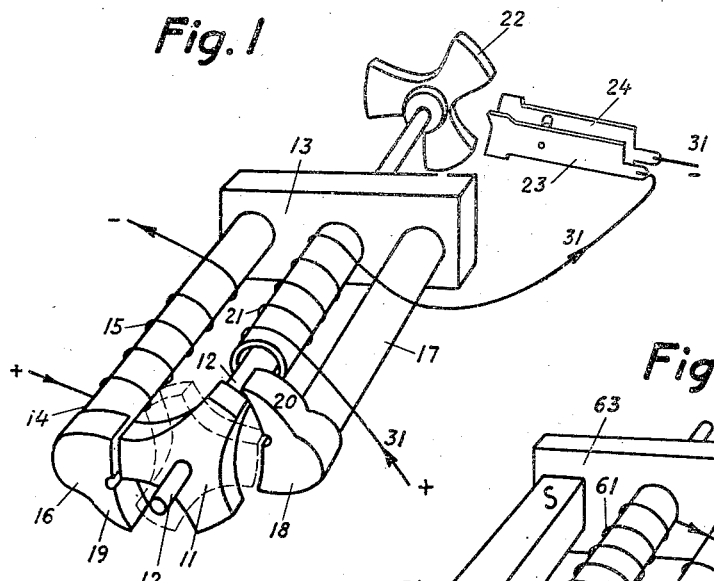
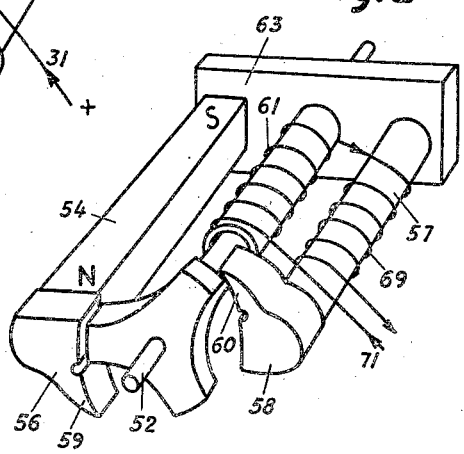
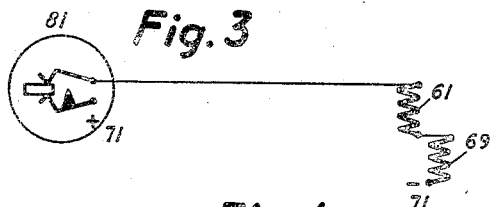
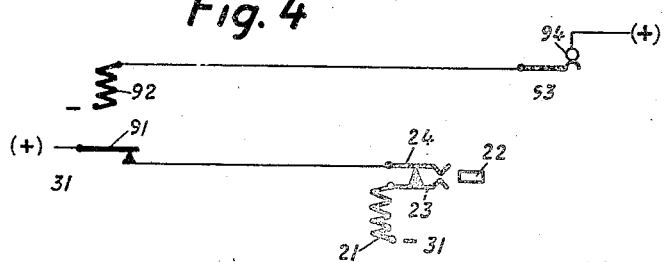
Inventor
S. E. WERNER
BY Peacock Downing Liebold
ATTYS Patented July 16, 1946

2,404,331

UNITED STATES PATENT OFFICE 2,404,331

ELECTROMAGNETIC MOTOR

Sture Edvard Werner, Stockholm, Sweden, assignor to Telefonaktiebolaget L. M. Ericsson, Stockholm, Sweden, a company of Sweden Application October 27, 1942, Serial No. 463,562
In Sweden November 14, 1941

11 Claims. (Cl. 172—36)

This invention relates to an electromagnetic motor for the drive of teletechnical devices, specially automatic telephone selectors, by means of electric current impulses and more particularly to a motor in which the rotor turns an angular step at every impulse.

A driving device for a selector must be able to operate partly step-by-step and partly continuously in so-called automatic drive. The motor as driving device has several great advantages compared to a stepping magnet. The motor is noiseless and rapid and the transmission elements required for the various movements of the selector are comparatively simple. The stepping magnet is easily driven by impulses step-by-step in solely one circuit and continuously in a circuit with self-interrupter in which one contact point is included. At a step-by-step drive with the motors known hitherto these work with the current impules in at least two circuits and for the continuous automatic drive a contact device with three contact springs is required, e. g. with two contact points. The object of the present invention is to produce, among other things, a simple driving motor so arranged as to make use of, when working, the advantages afforded by devices with stepping magnets. According to the invention this is made possible by arranging the motor so that the flow which is produced when the current closes over the motor winding, brings about a turning of the rotor a part of the angular step and that the constant magnetic flow of the motor when the current breaks makes the rotor turn the remaining part of the angular step.

A closer description of the invention is given with reference to enclosed drawing. Figs. 1 and 2 give the principles of two different forms of construction of a motor according to the invention and Figs. 3 and 4 illustrate various connecting diagrams for the impulse circuits of the motor. The drawing shows solely the details necessary to explain the invention.

In the embodiment shown in Fig. 1 the rotor consists of an armature 11 with three poles, fixed to an armature shaft 12, which is journalled in a yoke 13 and in not shown parts of the motor. The motor comprises, among other things, an electromagnet 14 with its coil 15 and a pole piece 16 as well as an iron core 17 with its pole piece 18. The pole pieces 16 and 18 are in the construction shown diametrically opposed in relation to each other and to the rotor shaft. They are both provided respectively with noses 19, 20 to indicate the moving direction of the rotor and these noses are placed in such a way that the rotor moves clockwise. The armature shaft 12 is surrounded by a rigidly suspended motor winding 21 which thus does not take part in the rotation of the shaft. On the extension of the shaft 12 there is a cam disc 22 made of insulating material with three cams which, when the shaft rotates, act upon and thus alternately break and close the contact between two contact springs 23 and 24 which are connected to the circuit 31 of the motor winding 21.

Fig. 2 shows a modification of the construction illustrated in Fig. 1. The electromagnet 14, 15, Fig. 1, is here replaced by a permanent magnet 54 with its pole piece 56 and its nose 59 indicating the direction. The motor winding 21 in Fig. 1 is here further divided into two part windings connected in series, one of which, 61, is rigidly suspended around the armature shaft 52 and the other, 69, is applied round the iron core 57. Naturally these windings may also be arranged in parallel-connection. The construction according to Fig. 2 presupposes the non-existence of a cam disc corresponding to cam disc 22, Fig. 1.

In the following the operating manner of a motor designed on the principles indicated will be closer described. The armature 11, Fig. 1, is held in the shown starting position by the constant magnetic flow produced by the electromagnet 14, 15. This flow passes from the electromagnet over the pole piece 16 over the armature 11 and the armature shaft 12 and over one part of the yoke 13 back to the electromagnet. Should now a closing of the current follow in the circuit 31 over motor winding 21, a flow is produced over the armature shaft 12, in which it passes in the direction opposed to the constant flow produced by the electromagnet 14, 15 and forces this to take another course. The flow of the motor winding 21 will therefore close over the one of the armature poles which lies next to the pole piece 18 and its nose 20 and over the iron core 17. The armature 11 is caused to turn clockwise a first part 60° of a complete step 120° so that one of its poles is centred in front of the pole piece 18. This position of the armature is indicated by dashes. In this position also the constant magnetic flow is partly closed over the iron core 17. When afterwards the current in the circuit 31 is broken, only the constant flow from the electromagnet 14, 15 remains, which then closes anew over the armature shaft 12. The armature now turns further clockwise a second part 60° of a step until one of its poles gets just in front of the pole piece 16. It has then progressed a complete angular step of 120°.

In the form of construction illustrated which has a three-divided armature and poles displaced 120° on the armature and pole pieces 16 respectively 18 displaced 180° on the stator the armature thus turns 2×60°, e. g. 120° by a complete current impulse. For every following current impulse the rotary movement of the armature takes places in the same direction and in the same manner as above described. When the armature turns from the shown normal position, when the current closes, in circuit 31, the three-parted cam disc 22 fixed to the shaft 12 likewise turns. Cam disc 22 breaks the contact between the contact springs 23, 24 as soon as the shaft 12 has rotated almost 60° which makes that the rotor 11 automatically continues a further 60° in the same direction, after which rotation the cam on the cam disc 22 which has broken the contact between the springs 23, 24, is turned out of gear with these springs which thus in the starting position of the armature again close the circuit 31. By means of the self-interrupting device the rotor 11 will thus, on closing of the circuit 31, be set in continuous rotation.

In the embodiment according to Fig. 2 the manner of operation is practically the same as the construction shown in Fig. 1. The flow produced by the permanent magnet 54 acts in the same way as the flow from the electromagnet in Fig. 1. Since the two part windings 61 and 69 are arranged to cooperate the flow will, on closing of the current in the circuit 71, in a still higher degree than in the construction in Fig. 1, be forced to pass through the iron core 57. This affords a still surer centring of the armature in front of the pole piece 58 in the previous embodiment. Consequently the construction according to Fig. 2 is particularly adapted for motors which are driven step-by-step by impulses from a dial where the armature must be centred as well at each closing as breaking of the current in order to ensure a correct displacement of the armature in accordance with the impulses.

Fig. 3 gives the principle of a switching diagram for the impulse current circuit in the embodiment according to Fig. 2. The impulse emitting device which, for instance, may be the subscriber's dial 81, is illustrated to the extreme left and the two part windings 61 and 69 on the motor are shown to the extreme right. In Fig. 3 it is assumed, for the sake of simplicity, that the impulse current circuit is shown at an occasion when the subscriber's dial during operation by not shown devices has been connected to the motor windings. The motor will in this single circuit 71 be controlled direct by the dial in the same way as described in reference to Fig. 2. Should the current from the positive pole of the battery be closed over the impulse contact of the dial 81 the current in the circuit 71 passes over motor winding 61, 69, and the rotor moves one part of a step. At the break following thereupon the rotor is displaced the second part of the step, and so forth.

When the motor runs in continuous automatic drive for instance as driving device for a line finder in an automatic telephone plant, the current circuit device for the drive of the motor takes the form shown in Fig. 4. It may be assumed that the circuits shown are those used for the design according to Fig. 1. However the circuit for the electromagnet 15 is not shown. The circuit 31 comprises among other things the motor winding 21 and the contact springs 23 and 24 which are acted upon by the disc 22. Moreover, in this circuit a contact 91 on the test relay 92 of the selector is illustrated. When the circuit 31 over arrangements which are not shown, is closed from the positive pole of the battery, the rotor will be set in rotation in the way indicated in the description in connection with Fig. 1. The rotation of the motor shaft then causes, in a normal manner, the contact arms of the selector to progress along a contact field. When the selector arm 93 finds a contact 94 belonging to a free line which in such a case is supposed to be connected to the positive pole of the battery a circuit is closed over the test relay 92. The test relay is immediately energized and prevents by opening the contact 91 the selector to continue its movement. The contact arms of the line finder are arranged in a normal manner so as to progress and make contact with the contacts in the selector field, before the rotor has moved a complete angular step. This causes the test relay to operate and break the contact 91 at a moment when the circuit has already been opened at the contact device 23, 24. If the selector shall be stopped for other reasons, for instance if it is just being driven past the last contact step, the circuit 31 is opened in a similar way, when no current gets in this circuit.

The principle of the invention may naturally be applicable to other forms of construction than those of the drawing. Thus the number of poles on the rotor may be arbitrary. Moreover, the poles of the stator which in the examples given consist of a magnet 15 respectively 54 and an iron core 17 respectively 57 may be placed in some other manner and be more than 2. The yoke 13 respectively 63 according to the drawing may be substituted by armature and pole pieces being arranged in the same way as the one shown which causes the moments of the motor almost to double by the same space of the motor. One yoke may also be common for two motors connected together, whereby the rotor shaft is through-going and the motor parts lie on each side of the yoke. The armatures may then move in opposite directions so that a double motor is obtained which can have both forward and backward drive. The number of points of bearing is identical in a motor of this kind and in the simple motor.

In the construction shown in Fig. 1 with self-interrupter in the circuit of the motor winding it is possible to drive the motor also with impulses from a dial over the circuit 31. The duration of the impulse is then determined by the self-interrupter. This kind of switching has in certain conditions proved advantageous.

I claim:

1. In an electro-magnetic motor for driving teletechnic devices and more particularly automatic telephone selectors by means of electric current impulses, a rotor, a motor winding operative when energized to effect a step-wise movement of said rotor, and means exerting a constant magnetic influence on said rotor and positioned with respect to said winding to effect a second step-wise movement of said rotor when the winding is de-energized.

2. In an electro-magnetic motor for driving teletechnic devices and more particularly automatic telephone selectors by means of electric current impulses, a rotor, a motor winding operative when energzed to effect a step-wise movement of said rotor, and a permanent magnet for exerting a constant magnetic influence on said rotor and positioned with respect to said winding to effect a second step-wise movement of said rotor when the winding is de-energized.

3. In an electro-magnetic motor for driving teletechnic devices and more particularly automatic telephone selectors by means of electric current impulses, a rotor, a motor winding operative when energized to effect a step-wise movement of said rotor, and electro-magnetic means exerting a constant magnetic influence on said rotor and positioned with respect to said winding to effect a second step-wise movement of said rotor when the winding is de-energized.

4. In an electro-magnetic motor for driving teletechnic devices and more particularly automatic telephone selectors by means of electric current impulses, a rotor, a motor winding operative when energized to effect a step-wise movement of said rotor, and means exerting a constant magnetic influence on said rotor and positioned with respect to said winding to effect a second step-wise movement of said rotor when the winding is de-energized, said winding acting on the rotor in opposition to said means.

5. In an electro-magnetic motor for driving teletechnic devices and more particularly automatic telephone selectors by means of electric current impulses, a rotor, a motor winding operative when energized to effect a step-wise movement of said rotor, and means exerting a constant magnetic influence on said rotor and positioned with respect to said winding to effect a second step-wise movement of said rotor when the winding is de-energized, and a rigid support for said winding arranged about the axis of the rotor.

6. In an electro-magnetic motor for driving teletechnic devices and particularly automatic telephone selectors by means of electric impulses, a stator, a rotor rotatable in said stator, a winding operative when energized to effect a step-wise movement of said rotor, said winding including two parts one of which is arranged about the axis of the rotor and the other part of which is supported on said stator, and means exerting a constant magnetic influence on said rotor and positioned with respect to said winding to effect a second step-wise movement of said rotor when the winding is de-energized.

7. In an electro-magnetic motor for driving teletechnic devices and more particularly automatic telephone selectors by means of electric current impulses, a rotor, a motor winding operative when energized to effect a step-wise movement of said rotor, means exerting a constant magnetic influence on said rotor and positioned with respect to said winding to effect a second step-wise movement of said rotor when the winding is de-energized, a circuit including said winding, a pair of contacts interposed in said circuit, means operable by said rotor for opening said contacts.

8. An electro-magnetic motor as claimed in claim 7, characterized in that said contacts and winding are included in a loop circuit alone.

9. In an electro-magnetic motor for driving teletechnic devices and more particularly automatic telephone selectors by means of electric current impulses, a rotor, a motor winding operative when energized to effect a step-wise movement of said rotor, a permanent magnet for exerting a constant magnetic influence on said rotor and positioned with respect to said winding to effect a second step-wise movement of said rotor when the winding is de-energized, and a support for said winding arranged about the axis of the rotor.

10. In an electro-magnetic motor for driving teletechnic devices and more particularly automatic telephone selectors by means of electric current impulses, a rotor, a motor winding operative when energized to effect a step-wise movement of said rotor, electro-magnetic means exerting a constant magnetic influence on said rotor and positioned with respect to said winding to effect a second step-wise movement of said rotor when the winding is de-energized, and a support for said winding arranged about the axis of said rotor.

11. A motor as claimed in claim 1 in which said winding and an impulse emitting arrangement are included in one loop circuit alone.

STURE EDVARD WERNER.